US007939162B2

(12) United States Patent
Ishiduka

(10) Patent No.: US 7,939,162 B2
(45) Date of Patent: May 10, 2011

(54) IMAGE RECEIVING SHEET FOR ELECTROPHOTOGRAPHY AND IMAGE FORMING SYSTEM USING THE SAME

(75) Inventor: Jiro Ishiduka, Moriya (JP)

(73) Assignee: Canon Kabushiki Kaisha, Tokyo (JP)

(*) Notice: Subject to any disclaimer, the term of this patent is extended or adjusted under 35 U.S.C. 154(b) by 643 days.

(21) Appl. No.: 11/938,529

(22) Filed: Nov. 12, 2007

(65) Prior Publication Data

US 2008/0124154 A1 May 29, 2008

(30) Foreign Application Priority Data

Nov. 10, 2006 (JP) ................................ 2006-305207

(51) Int. Cl.
*B32B 27/14* (2006.01)

(52) U.S. Cl. .................... 428/198; 428/212; 428/304.4; 428/332

(58) Field of Classification Search .................. 428/198, 428/212, 304.4, 332
See application file for complete search history.

(56) References Cited

U.S. PATENT DOCUMENTS

| | | | | |
|---|---|---|---|---|
| 2002/0034617 | A1 * | 3/2002 | Eberlein et al. | 428/201 |
| 2003/0219569 | A1 * | 11/2003 | Aono | 428/141 |

FOREIGN PATENT DOCUMENTS

| | | |
|---|---|---|
| EP | 0301585 A2 | 2/1989 |
| JP | 64-35452 | 2/1989 |
| JP | 4-216580 | 8/1992 |
| JP | 4-362679 | 12/1992 |
| JP | 5-216322 | 8/1993 |
| JP | 2003-84477 | 3/2003 |

* cited by examiner

*Primary Examiner* — Betelhem Shewareged
(74) *Attorney, Agent, or Firm* — Fitzpatrick, Cella, Harper & Scinto

(57) ABSTRACT

An image receiving sheet for electrophotography includes a base material; a toner receiving resin material layers provided on the base material and having a glass transition temperature of not less than 40° C. and not more than 80° C., wherein said toner receiving layers of the base material are interspersed.

7 Claims, 9 Drawing Sheets

IMAGE RECEIVING SHEET FOR ELECTROPHOTOGRAPHY AND IMAGE FORMING SYSTEM USING THE SAME

FIELD OF THE INVENTION

The present invention relates to an image receiving sheet for the electrophotography and an image forming system using the same. The image forming devices mainly using the electrophotographic type system, such as a copying machine, a printer, a facsimile machine, and a composite machine having them, are known. The image forming devices mainly using the electrophotographic type, such as a copying machine, a printer, a facsimile machine, and a composite machine of these functions, are known. Not only the monochrome image forming devices but the full-color image forming devices are commercialized. The requirement relative to a high image quality is even stronger with the usage in the increasingly wide field of the image forming device. In order to raise image quality in the full color image formation particularly, the improvement of the uniform of the glossiness is required. There is a smoothness of the outputted image as one of the factors which determine the glossiness.

Correspondingly to such needs, JP64-35452, a and JP05-216322, A disclose an image forming method, wherein the color toner which comprises a thermoplastic resin material is transferred onto the recording material which is provided with a thermoplastic transparent resin layer as a toner receiving layer (image receiving layer, glossing layer), and the color image is formed by heating and fusing it.

The fixing device (belt fixing device) of the cooling separation type provided with the fixing belt is used as the fixing device desirable in those image forming methods.

In the belt fixing device disclosed in JP04-216580 or JP04-362679, the recording material carrying the unfixed toner image is pressed and heated by a fixing belt which consists of a heat resistive film, and it is cooled with the recording material being in close contact to the fixing belt, so that toner image is solidified. The recording material carrying the toner image cooled and solidified is separated from the fixing belt.

As a result, the toner image is fixed with the state of being embedded in the transparent resin layer of the recording material. The transparent resin layer and the fixed toner image on the surface of the recording material follows in the shape the surface shape, and are coagulated, and the whole surface of the recording material turns into the smooth surface, and therefore, a color image having an excellent glossiness is provided.

The recording material with such the resin material layer is proposed in JP2003-084477, a. JP2003-084477, a proposes a transfer sheet for electrophotography which has a coated resin material layer the resin material layer about 20 micrometers thick which comprises a thermoplastic resin material having a glass transition temperature of the 85 or less degrees as a base material.

In the image forming method using such the recording material the high-glossiness and uniform image can be obtained in the whole surface. However, the high-glossiness image cannot be formed partially. That is, the print which meets the high requirement of the user cannot be provided by the conventional recording material and image forming method using such a recording material cannot be provided.

SUMMARY OF THE INVENTION

The object of the present invention is to provide an image receiving sheet for electrophotography which can form a high glossiness portion partially.

Another object of the present invention is to provide an image forming system which can form a high glossiness portion partially.

According to an aspect of the present invention, there is provided an image receiving sheet for electrophotography comprising a base material; a toner receiving resin material layers provided on said base material and having a glass transition temperature of not less than 40° C. and not more than 80° C., wherein said toner receiving layers of said base material are interspersed.

These and other objects, features, and advantages of the present invention will become more apparent upon consideration of the following description of the preferred embodiments of the present invention, taken in conjunction with the accompanying drawings.

BRIEF DESCRIPTION OF THE DRAWINGS

In FIG. 12, (*a*) is a schematic illustration (before the fixing) of the recording material of FIG. 11 carrying an unfixed toner image, and (b) is a schematic illustration of the recording sheet carrying the toner image by which the fixing was carried out with the belt fixing device (after the fixing).

DESCRIPTION OF THE PREFERRED EMBODIMENTS

The preferred embodiments of the present invention will be described in conjunction with the accompanying drawings.

Embodiment 1

First, a recording material as an image receiving sheet for electrophotography according to the present invention will be described.

(1) Recording Material

Figure 1:
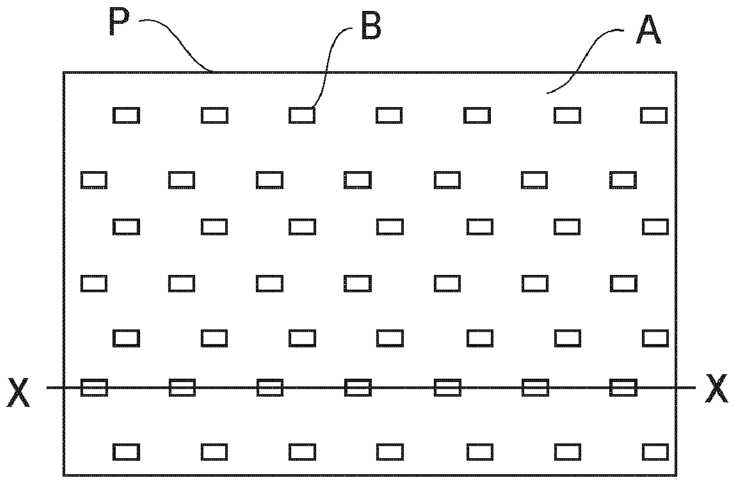
FIG. 1 is a schematic plan view of a recording sheet in Embodiment 1.

FIG. 1 is a schematic top plan view of a recording material (hereinafter, recording sheet) P as an image receiving sheet for electrophotography for forming a high quality image which has both of a high glossiness portions and a low glossiness portions.

Designated by A is a base material (hereinafter, base paper) of recording sheet P, and B is a toner receiving layer (toner receiving/glossing layer) (hereinafter, simply receiving layer) which is substantially transparent and which is made from the thermoplastic resin material. The base paper A is the common recording sheet for electrophotography or coated paper which has a pigment coating layer. The receiving layers B are formed so that they intersperse on the surface of base paper A. Here, a transparency of the toner receiving layer does not need to be a complete transparency. For example, if it is within the limits on which reproducibility is not influenced, the toner receiving layer may be somewhat opaque.

The toner receiving layer is the product made of the resin material, and it is softened and fused with the toner image formed on the surface by a smoothing apparatus (fixing device) which will be described hereinafter, so that it is smoothed. The toner image is embedded by a smoothing process by the smoothing apparatus into the toner receiving layer, by which the smoothing is accomplished. For this reason, a glass transition temperature of the thermoplastic resin material which constitutes the toner receiving layer is not less than 40 degrees and not more than 80. On the other hand, the portion of the base material in which the toner receiving layer is not provided is hardly softened and fused at the time of the smoothing process, and therefore, unlike the portion of toner receiving layer, the glossiness thereof does not increase, and the portion becomes a low glossiness portion.

The reason why the glass transition temperature Tg of the toner receiving layer is limited within the above described range is as follows.

When the glass transition temperature Tg of the toner is lower than the 40 degrees, the blocking of the toner tends to occur in the inside of the developing device and so on at the time before forming the unfixed toner image on the recording material. On the other hand, when the glass transition temperature Tg of the toner is higher than the 80 degrees, it is necessary to make high excessively the temperature at the time of the heating by the smoothing apparatus. In addition, the glass transition temperature Tg of this toner can be measured by a method as will be described hereinafter.

It is desirable that the toner receiving layer softens and fuses with the toner image formed on recording sheet P, using such the toner at the time of the smoothing process, and therefore, the glass transition temperatures of the toner and the toner receiving layer are substantially equal in this example. In other words, the toner and the toner receiving layer comprise the polyester resin material as main component, as will be described hereinafter.

The measuring method of the glass transition temperature Tg of the toner receiving layer (toner) will be described.

The glass transition temperature Tg of the toner receiving layer is measured in compliance with ASTM (D3418-82) using differential scanning calorimeter (DSC measurement device) and DCS-7 (available from the Perkin-Elmer) or DSC2920 (available from TA Instruments, Japan).

The amount of the measured sample may be 5-20 mg. In this example, weighing of the 10 mg was carried out to the precise. The temperature of the aluminum pan for the sample which contained the measured sample, and the aluminum pan of the empty as the reference is raised and lowered within the limits of the temperature measuring range (30 to 200 degrees), as follows.

First, In order to remove the influence of the water content included in the resin material etc, the temperatures of both aluminum pans are raised under the following conditions (temperature rise I), and thereafter, the temperatures are lowered (temperature decrease II).

Thereafter, both the aluminum pan temperatures are raised under the following condition (temperature rise III). From the difference between the temperature curves obtained at this time, the temperature curve (DSC curve) of the resin material of the toner receiving layer is determined.

Measuring Conditions:

Temperature rise I: 30 degrees C.-200° C., temperature rising speed=10° C./min

Temperature decrease II: 200° C.-30° C., temperature rising speed=10° C./min

Temperature rise III: 30° C.-200° C., temperature rising speed=10° C./min

Thus, from the DSC curve of the determined temperature rise III, tg is determined by a midpoint method.

The recording sheet P of FIG. 1 comprises base paper A and receiving layers B applied thereon. The receiving layers (B) have the rectangular shape uniformly, and they are arranged regularly. In this embodiment, as shown in FIG. 1, the rectangular pattern has a length of about 10 mm, and a width of about 6 mm, and a size of paper is A4. As shown in FIG. 1. the arrangement of the patterns are such that seven patterns are arranged along the long side direction of A4 size sheet at intervals of about 25 mm, and seven patterns are arranged along the short side direction at intervals of about 20 mm. Therefore, a total of 49 rectangular patterns are interspersed. In addition, the pattern of the long side direction of the recording material is staggered. In this embodiment, the receiving layers (B) were interspersed as shown in FIG. 1. But, this pattern, the size, and the arrangement pattern are not necessarily restricted to this example. In addition, many patterns are arranged at equal intervals in this example. But, as long as the intervals between the patterns are substantially the same, the patterns are satisfactory, and the intervals may more or less be deviated due to the manufacturing error.

Figure 9:
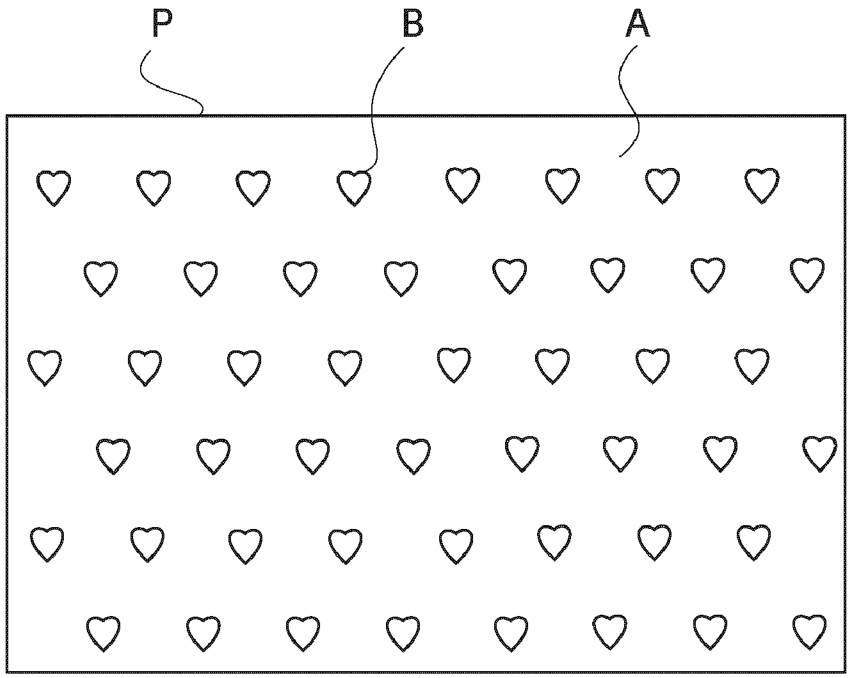
FIG. 9 is a schematic plan view of a recording sheet according to another example.

The patterns of the receiving layers (B) may not be the same. For example, the rectangular shape patterns as shown in FIG. 1, and the heart patterns as shown in FIG. 9 may be arranged alternately and regularly. Furthermore, the patterns of the receiving layers (B) may be the letters. More specifically, the letters called CANON (registered Trademark) may be arranged obliquely and regularly on the recording sheet.

Importantly, the receiving layer B of recording sheet P melts near the fixing temperature. By doing so, as will be described hereinafter, when fixing the toner image on the recording material P, the toner image is embedded in the receiving layer B, and therefore, the high glossiness toner surface can be provided.

A manufacturing method of the recording sheet (P) will be described. For example, the coated paper which has the pigment coating layer as the base paper (A) is prepared. A thermoplastic transparent resin layer is applied on this by a silk-screen printing and so on as the receiving layer (B). By doing so, the lower layer of the receiving layer (B) is the pigment layer used as the base paper (A), and therefore, it is the surface smooth having a high white color. The resin material of the receiving layer (B) which is an outermost surface layer does not need to contain the pigment, in order to raise the whiteness degree, for example. Therefore, the thermoplastic transparent resin layer which constitutes the maximum surface layer of the recording sheet (P) can be designed with the priority on the function of raising the glossiness, and the function of embedding the toner.

An example of a specific manufacturing method of the recording sheet (P) will be described. The coated paper which has the pigment coating layer is prepared as the base paper (A). The thermoplastic transparent resin material is applied using silk-screen printing on one side or both sides of this base paper (A). By doing so, the receiving layer (B) is applied with the partial or regular interspersion, and the intended recording sheet (P) is provided.

Figure 2:
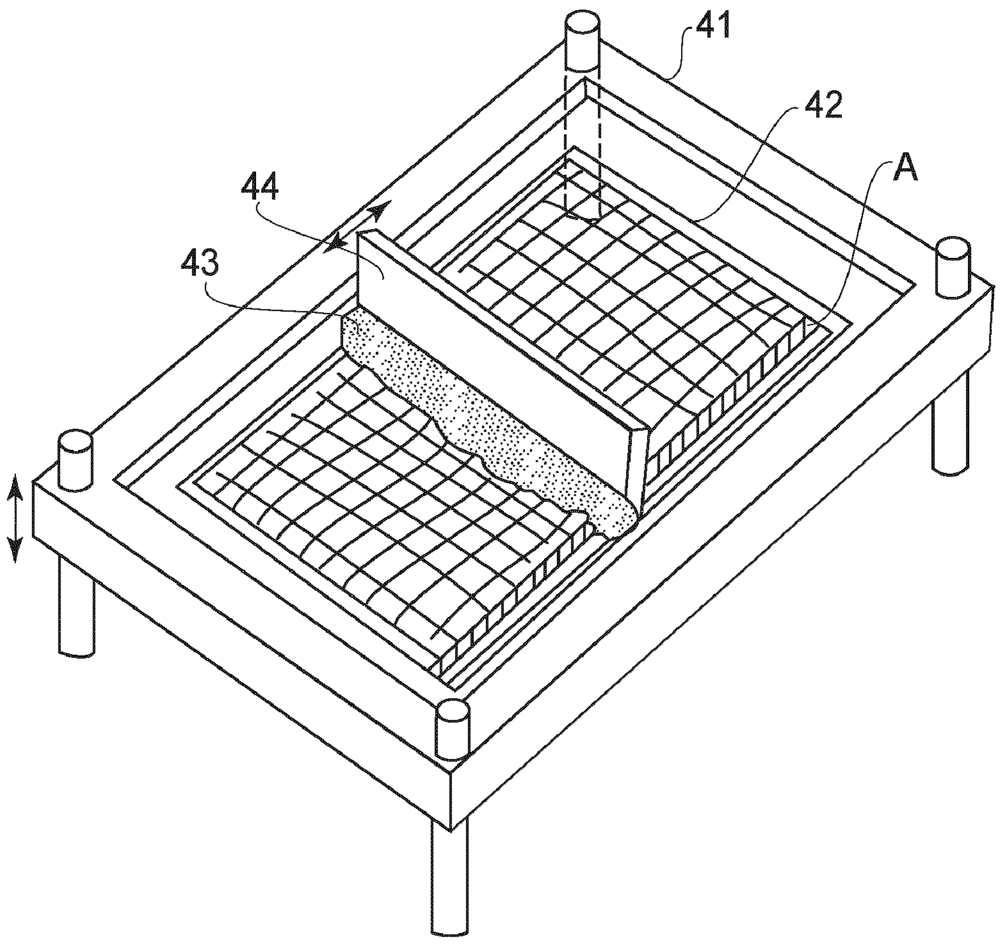
FIG. 2 is a schematic perspective view of a screen printing machine.
Figure 3:
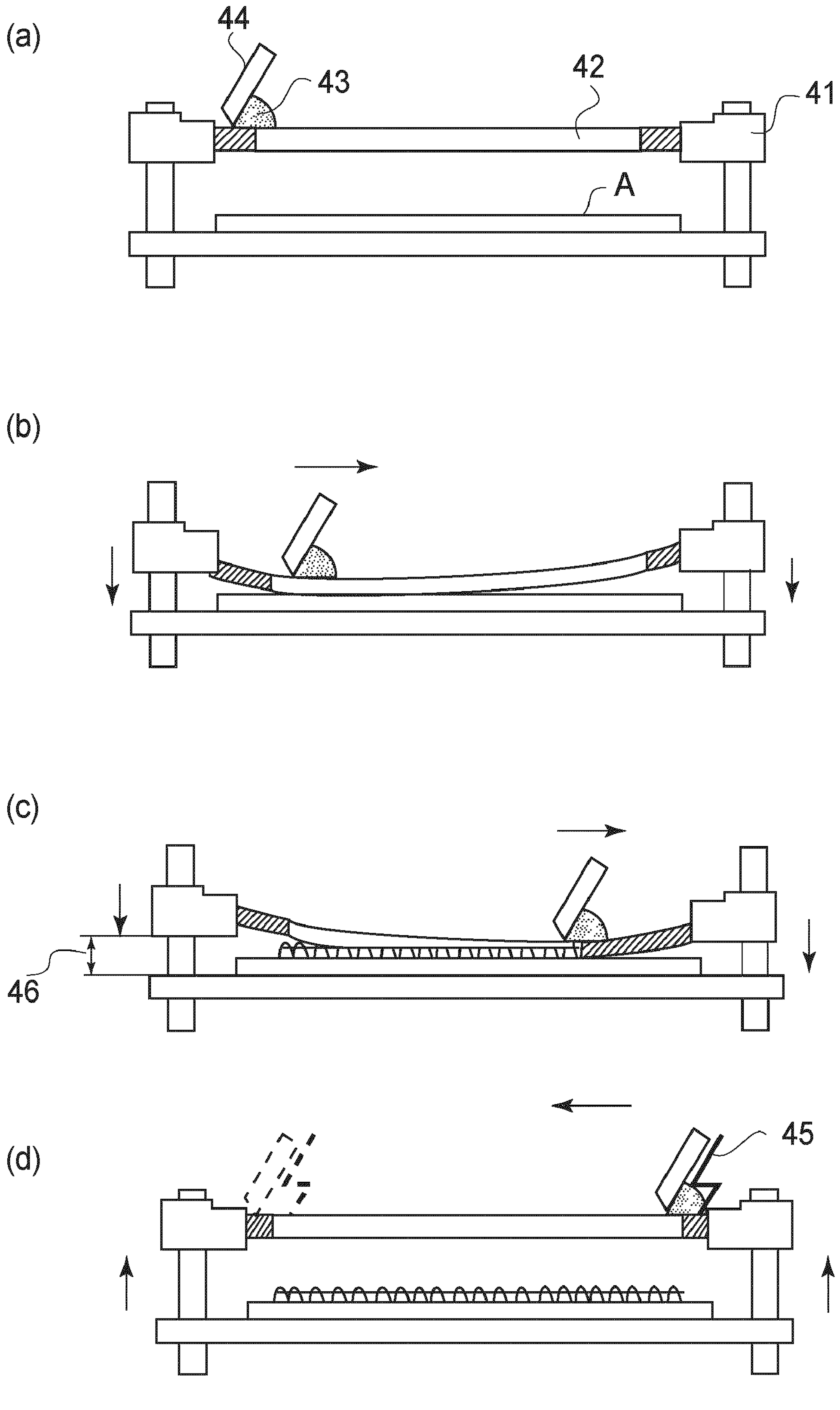
FIG. 3 is an illustration of a screen printing step.

FIG. 2 is a schematic perspective view of the screen printing machine and FIG. 3 is an illustration of the screen printing steps. The circumference of the four quarters of a screen 42 is stretched and fixed to a version frame 41, and a printing film is produced thereon manually or optically. The materials of the screen 42 are mainly the meshed fabrics of Nylon, Tetron, stainless steel or the like. The ink 43 for the screen printing is introduced onto the shallow vessel-shaped frame 41. By a squeegee 44 (thick blade-like rubber), the upper surface (screen surface) of the printing film is rubbed with pressure. By doing so, the ink 43 passes the portion of the printing film of the surface of the screen 42, and is extruded onto the surface of the print material (A) put on the bottom surface. In this manner, the printing is carried out.

According to this printing method, the mesh of the screen 42 thereof can be changed by exchanging the frame 41, and the thickness and the surface property of the coating film can be managed by the material of the screen 42, the hardness and the angle of the squeegee 44, and the distance 46 between frame 41 and surface of the print material (A).

This will be described. As shown in (a) of FIG. 3, the printing ink 43 is supplied into the frame 41 and the hardness, the angle, and the pressure of the squeegee 44 are adjusted. As shown in (b), when the frame 41 descends, the squeegee 44 moves and the ink 43 is applied on the surface of the print material (A) through the screen 42, as shown in (c). In (d), the frame 41 goes up and the printing operation completes. The residual ink 43 is collected into the scraper 45, and the same steps are repeated in the subsequent printing operation.

In the case of multilayer coating, the same steps are carried out for respective layers, and the application of the subsequent layer is carried out through similar steps after drying.

As for the examples of the thermoplastic transparent resin material of the receiving layer (B). There are polyester resin material, styrene acrylate ester resin material, styrene methacrylate ester, and so on. Particularly, the polyester resin material is desirable.

Examples of the polyhydric alcohol component include ethylene glycol, the propylene glycol, 1,4-butanediol, 2,3-butanediol, diethylene glycol, triethylene glycol, 1,5-pentane diol, 1,6-hexane diol, neopentyl glycol, 1,4-cyclohexanedimethanol, dipropylene glycol, polyethylene glycol, polypropylene glycol, a monomer of olefin oxide added bisphenol A.

Examples of the polyvalent carboxylic acid component include maleic acid, maleic anhydride, fumaric acid, phthalic acid, terephthalic acid, isophthalic acid, malonic acid, succinic acid, glutaric acid, dodecylsuccinic acid, n-octylsuccinic acid, n-dodecylsuccinic acid, 1,2,4-benzenetricarboxylic acid, 1,2,4-cyclohexanetricarboxylic acid, 1,2,4-naphthalenetricarboxylic acid, 1,2,5-hexanetricarboxylic acid, 1,3-dicarboxy-2-methyl-2-methylenecarboxy propane, tetra(methylenecarboxy)methane, 1,2,7,8-octanetetracarboxylic acid, trimellitic acid, pyromellitic acid, lower alkyl esters of these acids.

The polyester resin material is compounded by the polymerization of one or more of the above described polyhydric alcohol component, and one or more of the polyvalent carboxylic acid component.

As a resin component of the toner, it is polyester resin material in the color toner and it is mainly styrene acrylic resin material in the monochromatic toner. As for the thermoplastic resin material of the receiving layer (B), it is desirable that it is high in the compatibility with the toner.

For this reason, in this embodiment, one or more (mixture) is selected from the polyester resin material, the styrene acrylate ester resin material, the styrene methacrylate ester, and so on as the material of the image receiving layer (B).

In the transparent resin layer as the receiving layer (B), a pigment, a parting material, an electroconductive material, and so on can be added, as long as the transparency thereof is not deteriorated. In that case, it is desirable that the resin material content of the main component is 80 or more on the basis of weight of the resin material layer. The transparent resin layer as the receiving layer (B) is preferably adjusted in the composition thereof so that a surface electric resistance at the temperature of 20° C. and the relative humidity of 85% is $8.0\times10^{8}\Omega$ or more.

The manufacturing method of the recording sheet (P) is not limited to the above described manufacturing method. The multilayer structure is not inevitable if it is the coated paper which is provided with the surface layer of the thermoplastic resin material which has the melting property of melting near the fixing temperature. Various additives, such as the pigment, may be added.

The melting property near the fixing temperature of the resin material which constitutes the receiving layer (B) will be described.

The melting property can be investigated by measuring the viscoelastic property using the measuring method (JIS K 7117-2) of the viscosity in the constant shear rate by the rotation type viscosity meter for the plastic resin material (resin material of the liquid, the letter of emulsion, or the letter of dispersion).

Such a measurement is effected about the surface of the resin material which fuses near the fixing temperature. As a result, the desirable storage modulus is not more than $1\times10^{7}$ Pa·s at 150 degrees C. A further preferable storage modulus is not more than $1\times10^{6}$ Pa·s at 150 degree.

However, when the surface of the coated paper has the multilayer structure, such a viscoelasticity measurement cannot not be carried out in many cases.

For example, the outermost layer can be manufactured by this method. The resin material which has the storage modulus of $1\times10^{3}$ Pa·s at 150 degrees is applied into the 10-50 micrometer thickness, and then, the resin material which has the storage modulus of $1\times10^{7}$ Pa·s at the 150 degree is applied into 1-5 micrometer thickness thereon. With this structure, the effects of the change of the glossiness and embedding of the toner are provided. However, two or more layers function as a whole in the usage, and therefore, the combination of the storage modulus of the resin materials or the storage modulus of the mixture of the resin materials does not represent the effects of the change of the glossiness, or the embedding of the toner.

In addition, it is very difficult to collect the amounts which meet to such the viscoelasticity measurement from the outermost layer resin material of the usual coated paper.

In view of this, in this embodiment, the following discriminating method for the coated paper (melting property) is used. The description will be made as to the discriminating method for the usual coated paper of which the surface layer does not melt, and the coated paper which has the resin material layer of which the surface layer melts near the fixing temperature.

First, the coated paper is introduced into the fixing device and the coated paper is stayed for the 5 seconds in the fixing nip, so that, it is sufficiently heated. The coated paper is taken out after that. The coated paper is discriminated by confirming the state on the surface of the recording material (whether the resin material melts or not) at this time.

More specifically, in the case of the coated paper using the resin material which melts at the fixing temperature, the resin material of the paper face melts and it extrudes out of the fixing nip, and therefore, the marks of the fixing nip remain as a step. Therefore, the discrimination is possible on the basis of the presence or absence of this step shape. The configuration of this step is such that. The resin material bulges upstream with respect to the advancing direction of paper. The resin material is thin within the nip, and the resin material which began to melt downstream of the nip is crushed in the downstream after the nip passing, and the resin material is in the form of somewhat smooth step. The height of this step is dependent on the thickness of the resin material layer, but they are about 1-10 micrometers.

On the other hand, there is almost no step in the case of the coated paper using the pigment coating layer which does not melt at near the fixing temperature, and the gently-sloping unsmoothness by having pressed in the nip is produced. In addition, discoloration may be observed resulting from the heating.

The discrimination of the melting property of the coated paper is possible through the above-described method. Alternatively, the following method can also be used. For example, a metal rod of a certain weight heated near the fixing temperature (for example, about 180° C.) is placed on the coated paper for a predetermined time, and thereafter, it is lifted. The discrimination is effected on the basis of observing whether the marks of the metal rod are in the position of the coated paper on which the metal rod was placed.

The recording sheet (P) used in this embodiment includes the coated paper (base paper) (A) which has basis weight of 170 g/m$^2$, and the transparent resin layer (receiving layer (B)) (20 micrometer in thickness) which has polyester (thermoplastic resin material) as a main component on one side of the base paper.

The test piece was made from the polyester resin material alone for the receiving layer (B), and the thermal expansion coefficient thereof was measured. It was $7\times10^{-5}$/° C.

The following image forming apparatus and fixing device are used for the recording sheet (P) described above in this embodiment, and the image formation is effected for it. The image forming apparatus and the fixing device will be described.

Figure 4:
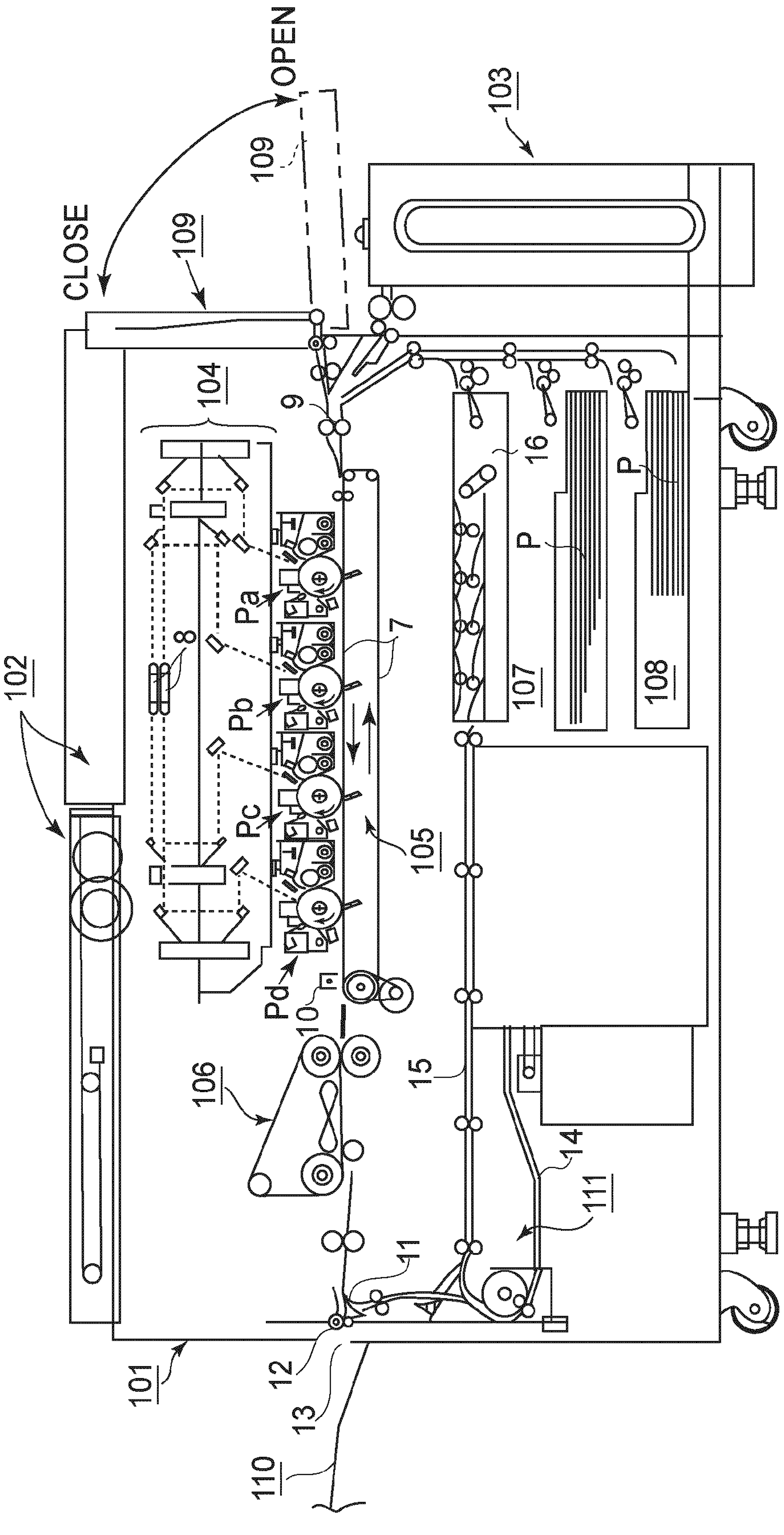
FIG. 4 is a schematic illustration which illustrates a general arrangement of an example of an image forming apparatus.

(2) Image Forming Apparatus:

FIG. 4 is a schematic illustration which illustrates the general arrangement of an example of the preferable image forming system according to the present invention.

The image forming apparatus which constitutes this image forming system is the full-color (four colors) laser beam printer using the electrophotographic process. This image forming apparatus can form the image on the recording sheet (P), the usual sheet, and so on as the image receiving sheet for electrophotography. Designated by 101 is a printer body. Designated by 102 is a reader mechanism provided in the upper side of this printer body 101. Designated by 103 is a mass sheet feeding apparatus provided next to the right-hand side on the drawing of the printer body 101. The example of the image formation to the recording sheet (P) top will be described.

First, the description will be made about the various image forming means as the image forming means for forming an unfixed toner image on the recording sheet (P).

In the printer body 101, designated by Pa, Pb, Pc and Pd are first-fourth image forming stations juxtaposed horizontally form the right to the left on the drawing (the in-line structure, tandem type). Designated by 104 is a laser scanning mechanism (laser scanner) which has a plurality of optical scanning means disposed on top side of the first-fourth image forming stations Pa, Pb, Pc and Pd. Designated by 105 is a transfer belt mechanism disposed in the lower part of the first-the fourth image forming stations Pa and Pb, Pc, and Pd. Designated by 106 is a fixing device disposed downstream, with respect to the sheet feeding direction, of the transfer belt mechanism 105. Designated by 107 and 108 are first and second sheet feeding cassettes which are disposed one above the other below the transfer belt mechanism 105. Designated by 109 is a manual insertion sheet feeding tray disposed at the right-hand side of the printer body 101. This manual insertion sheet feeding tray 109 can be folded as shown by the solid lines relative to the printer body 101. At the time of use, it is opened, as shown by the chain line.

The reader mechanism 102 carries out color separation read of the image information of a full-color original by a photoelectric conversion elements (solid-state image sensing device), such as a CCD.

The laser scanning mechanism 104 outputs the laser beam modulated correspondingly to each color separation read image information from the reader mechanism 102, respectively to the first-fourth image forming stations (Pa), (Pb), (Pc), and (Pd).

Figure 5:
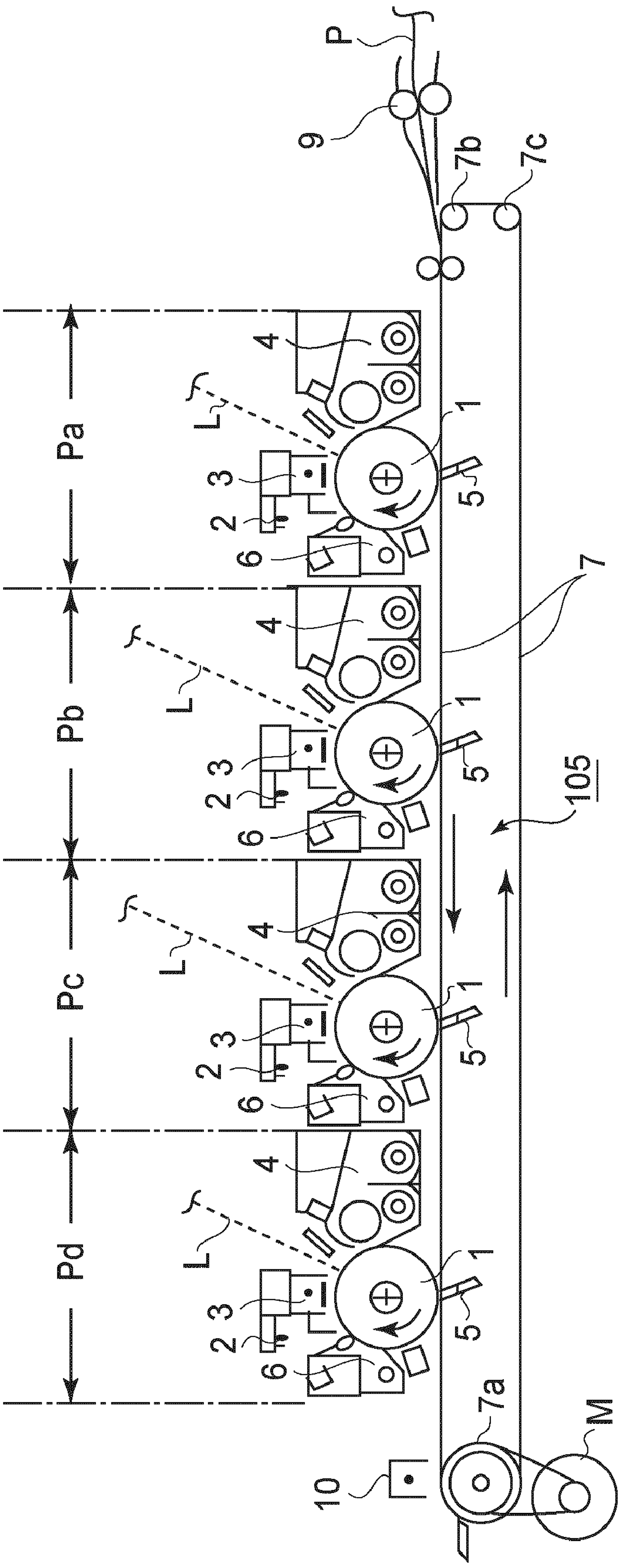
FIG. 5 is enlarged views of first-fourth image formation portions and a transfer belt mechanism portion.

FIG. 5 is enlarged views of the first-fourth image forming stations (Pa), (Pb), (Pc), (Pd) and the transfer belt mechanism 105. The first-fourth image forming stations (Pa), (Pb), (Pc), and (Pd) have the similar structures. In other words, each has the photosensitive drum (hereinafter, drum) 1 as the image bearing member. There are a whole-surface-exposure lamp (discharging lamp) 2, a primary charger 3, a developing device 4, a transfer charger 5, and a cleaner 6 grade which are the process means actable on the drum 1. The predetermined amounts of yellow, magenta, cyan, and black toner are filled into the developing device 4 of the firsts-fourth image forming stations (Pa), (Pb), (Pc), and (Pd) from the supplying device, respectively.

The transfer belt mechanism 105 comprises an endless transfer belt 7, a driving roller 7*a* on which the transfer belt 7 is extended and stretched, and turning rollers 7*b* and 7*c*. The driving roller 7*a* is driven by driving motor M through the power transmuting devices, such as the cogged belt device, so that, the transfer belt 7 is rotated in the counterclockwise direction of the arrow at the predetermined speed. The transfer belt 7 is made from a sheet of dielectric resin materials, such as polyethylene terephthalate resin sheet (PET) (resin material sheet), the polyvinylidene fluoride resin material sheet, polyurethane resin sheet. The opposite ends of the sheet are overlaid and are stuck to provide an endless shape. Alternatively, a seamless belt may be used.

The operation for forming the full-color image is as follows. The firsts-fourth image forming stations (Pa), (Pb), (Pc), and (Pd) are driven sequentially in timed relation with the image forming operation. The drums 1 rotate in the clockwise direction of the arrow correspondingly to the drive. In addition, the transfer belt 7 of the transfer belt mechanism 105 is rotated. The laser scanning mechanism 104 is also driven. The primary charger 3 charges the surface of the drum 1 uniformly to the predetermined polarity and potential in synchronism with this drive. The laser scanning mechanism 104 exposes the surfaces of drum 1 to the laser beam scanning light L corresponding to the image signal. An electrostatic latent image corresponding to the image signal is formed on the surface of each drum 1 by this. In other words, the laser scanning mechanism 104 deflects the laser beam emitted from the light source device by a rotating polygonal mirror 8, bends the beam by a reflection mirror, and focuses the beam on the drum 1 by an f-θ lens. By doing so, an electrostatic latent image corresponding to the image signal is formed on the photosensitive drum. The formed electrostatic latent image is developed into a toner image with the developing device 4.

A yellow toner image corresponding to the yellow component image of the full-color image is formed on the peripheral surface of the drum 1 of the first image forming station (Pa) by the above electrophotographic image forming process operations. A magenta toner image corresponding to the magenta component image of the full-color image is formed on the peripheral surface of the drum 1 of the second image forming station (Pb). A cyan toner image corresponding to the cyan component image of the full-color image is formed on the peripheral surface of the drum 1 of the third image forming station (Pc). A black toner image corresponding to the black components image of the full-color image is formed on the peripheral surface of the drum 1 of the fourth image forming station (Pd).

On the other hand, the sheet feeding roller of a selected feeding portion is driven by inner among the large capacity sheet feeding apparatus 103, the first sheet feeding cassette 107, the second sheet feeding cassette 108, and the manual feed tray 109. By this, one sheet is separated and fed from the recording sheets (P) stacked in the feeding portion. And, it is supplied onto the transfer belt 7 of the transfer belt mechanism 105 through the feeding rollers and the registration roller 9. The recording sheet (P) supplied on the transfer belt 7 is fed to the transfer portions of by the first-fourth image forming stations (Pa), (Pb), (Pc), and (Pd) sequentially by the transfer belt 7.

In other words, the transfer belt 7 of the transfer belt mechanism 105 is rotated by the driving roller 7*a*. Thereafter, when it is confirmed that it is in the predetermined position, the recording sheet (P) is fed to the transfer belt 7 from the registration roller 9, and is fed towards the transfer portion of the first image forming station (Pa). Simultaneously therewith, the image writing signal is turned on. The image formation on the drum 1 of the first image forming station (Pa) is carried out at the predetermined timing on the basis of on-signal. And the transfer charger 5 applies the electric field or the charge in the transfer portion of the drum 1 bottom, so that the first color (yellow) toner image formed on the drum 1 top is transferred onto the recording sheet (P) top. The recording sheet (P) is firmly retained by the electrostatic attraction force on the transfer belt 7 by this transferring action, and it is fed to the transfer portions of the seconds-fourth image forming stations (Pb), (Pc), and (Pd) sequentially. The magenta, cyan, and black toner images formed on the photosensitive drums of the image forming stations are transferred onto the superimposing sequentially. By this, the four color full-color toner image (unfixed) is synthetically formed on the recording sheet (P).

The recording sheet (P) carrying the full-color toner image is electrically discharged by the separation charger 10 in the downstream portion (with respect to the feeding direction) of the transfer belt 7, so that the electrostatic attraction force attenuates. By doing so, it separates from the distal end of the transfer belt 7. Particularly, under a low humidity ambient condition, the recording sheet (P) is dry and, and therefore, the electric resistance thereof is high. Therefore, the electrostatic attraction force between the recording sheet and the transfer belt 7 is large, and the effect of the separation charger 10 is large. Normally, the separation charger 10 charges the recording sheet (P) electrically with the toner image unfixed, and therefore, a noncontact type charger is used.

The recording sheet (P) separated from the transfer belt 7 is fed to the fixing device 106, it is heated and pressed by the fixing device 106, and the color toner images are mixed and fixed on the recording sheet (P), to provide the color print.

When the one-sided image forming mode is selected, the recording sheet (P) which discharged out of the fixing device 106 passes along an upside of a selector 11 retained in a first orientation, and the paper is delivered onto an outside sheet discharge tray 110 from the sheet discharge opening 13 by the sheet discharging rollers 12.

When the both sided-image forming mode is selected, the one-side-fixed recording sheet (P) which is discharged out of the fixing device 106 is deflected by the selector 11 retained in the second orientation at a reversing-refeeding mechanism 111. And it is reversed in facing orientation by a reversing portion (switch-back mechanism) 14 of this reversing-refeeding mechanism 111, and thereafter, it feeds to the both-sided sheet feeding path 15, and is once accommodated in an intermediate tray 16.

The recording sheet (P) accommodated in the intermediate tray 16 is fed toward the registration roller 9 from the intermediate tray 16 by the sheet feeding roller driven at the predetermined control timing. And, the paper is re-fed with the state of the second surface facing up onto the transfer belt 7 of the transfer belt mechanism 105 from the registration roller 9. By this, the full-color (four color) toner image is synthetically formed on the second side similarly to the case of the image formation on the first side of the recording sheet (P) by the first-fourth image forming stations (Pa) of the fourth, (Pb), (Pc), and (Pd).

The recording sheet (P) having received the toner image formation for the second side is separated from the transfer belt 7, and is fed to the fixing device 106. And, it is subjected to the toner image fixing process for the second side with the fixing device 106, passes along the upper side of the selector 11 switched to the first orientation, and is discharged as the both sided print onto the outside sheet discharge tray 110 from the sheet discharge opening 13 by the sheet discharging roller 12.

A monochromatic print can also be produced. When the image forming mode thereof is selected, only the image forming station corresponding to the image forming mode selected from the firsts-the fourth image forming stations (Pa), (Pb), (Pc), and (Pd) carries out the image forming operation, the photosensitive drum is rotated, however the other image forming stations do not carry out the image forming operation. The toner image is transferred onto the recording sheet (P) fed by the transfer belt mechanism 105 in the transfer portion of the image forming station which carried out the image forming operation.

Figure 6:
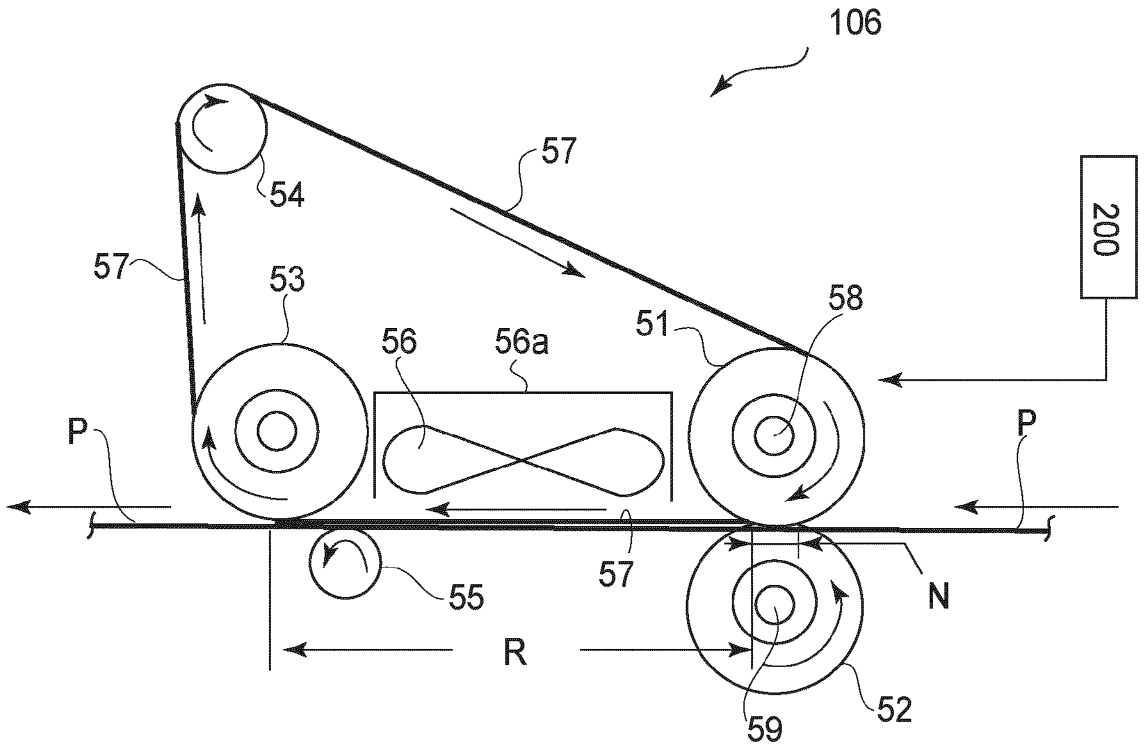
FIG. 6 is an enlarged schematic view of a fixing device.

(3) Fixing Device 106:

The description will be made about the fixing device as a smoothing apparatus. The smoothing apparatus is not restricted to the belt fixing device which will be described hereinafter however, other structures are sufficient as long as they can perform the smoothing process for the recording sheet on which the toner receiving layer is provided. FIG. 6 is an enlarged schematic view of the fixing device 106. The fixing device 106 in this embodiment is a belt fixing device of a cooling separation type provided with a fixing belt.

This belt fixing device 106 comprises a first fixing roller 51, a rotatable roller 53 as a separation roller spaced with a prescribed interval from this first fixing roller 51, and a rotatable roller 54 as a tension roller disposed on the upper side of this rotatable roller 53. The endless fixing belt 57 (first rotatable member) is extended and stretched around these three rollers 51, 53, and 54. The belt fixing device 106 further comprises a second fixing roller 52 (second rotatable member) as a pressing roller which interposes this fixing belt 57 and which is press-contacted to the first fixing roller 51.

Hereinafter, the above described first fixing roller 51 is called a fixing roller 51. The rotatable roller 53 is called a separation roller 53. The rotatable roller 54 is called a tension roller 54. The second fixing roller 52 is called a pressing roller 52.

In the portion of the fixing belt between the fixing roller 51 and the separation roller 53, an assisting roller 55 is contacted to the outer surface of the fixing belt at the position adjacent to the separation roller 53. The cooling fan 56 as the cooling means is provided between the fixing roller 51 and the separation roller 53 inside of the belt 57, and it carries out air-cooling of the fixing belt portion between the fixing roller 51 and the separation roller 53. The fixing roller 51, the pressing roller 52, the separation roller 53, the tension roller 54, and the assisting roller 55 are arranged substantially in parallel.

The fixing roller 51 comprises concentric circle-like three layer structures (a core portion, an elastic layer, a parting layer). The core portion is constituted by hollow pipe aluminum with 44 mm in diameter, and a thickness of 5 mm. The elastic layer is constituted by silicone rubber with a JIS-(A) hardness of 50 and a thickness of 300 micrometers. The parting layer is constituted by 50-micrometer-thick (PFA). A halogen lamp 58 as a heat source (roller heater) is provided in the hollow pipe of the core portion.

The pressing roller 52 has the similar structure. The elastic layer is a 3-mm-thick silicone rubber. This is for increasing the fixing nip by the elastic layer. Designated by 59 is a halogen lamp as a heat source (roller heater) provided in the inside of the hollow pipe of the core portion of the pressing roller 52.

The fixing roller 51 and the pressing roller 52 interpose the fixing belt 57, and are press-contacted to each other by the predetermined urging force. By this, a fixing nip N as a heating and pressing portion which has prescribed width with respect to the sheet feeding direction is provided. The pressure of the pressing roller 52 is 490 Ns (50 kgf) in the total pressure. The width of fixing nip N at this time was 5 mm.

Here, it is preferable to choose the surface hardness of the fixing roller 51 in accordance with the fixing belt 57. If the surface hardness of the fixing roller 51 is low, the fixing belt 57 bends, and therefore, the toner is not sufficiently pushed into the receiving layer of the recording material. With respect to the height difference remains. When the hardness of the fixing belt 57 is low, in order to increase the hardness of the fixing roller 51, the elastic layer may be made thin, or it may be omitted, and only the surface layer of (PFA) may be used, or only the core of the aluminum may be used.

The material of the surface of the fixing belt 57 comprises silicone rubber, fluorine-containing rubber, fluorinated resin material, or polyimide resin material, and the surface is a high-glossiness specular surface. More specifically, the fixing belt 57 transfers the high-glossiness surface property thereof to the image surface of the recording sheet (P) by being heated with close contacting to the image surface of the recording sheet (P) which has the interspersed toner receiving layers. From this viewpoint, the fixing belt 57 which has 60 or more and 100 or less glossiness (60 degrees) is used in this example. In addition, the glossiness of the belt can be selected properly in accordance with the glossiness of the image determined in the image forming apparatus. In addition, the glossiness of the belt is measured with the incident angle and the light receiving angle of 60-degree using the handy type glossiness meter ((PG)-1M) available from Nippon Denshoku, inc. (JIS Z 8741). This example uses the fixing belt of the glossiness of 90.

The fixing roller 51 is rotated in the clockwise direction of the arrow at the predetermined speed by an unshown driving mechanism. The fixing belt 57 rotates in the clockwise direction of the arrow by the rotation of this fixing roller 51. The separation roller 53, the tension roller 54, the pressing roller 52, and the assisting roller 55 are driven by the rotation of the fixing belt 57. The tension roller 54 gives the predetermined tension to the fixing belt 57.

The electric power is supplied to the halogen lamps 58 and 59 disposed in the fixing roller 51 and the pressing roller 52, respectively, and the fixing roller 51 and the pressing roller 52 are heated by the heat generation of the halogen lamps 58 and 59 from the inside, by which the surface temperature rises. The surface temperatures of the fixing roller 51 and the pressing roller 52 are sensed by unshown thermistors, and the detected temperatures are fed back to an unshown control circuit. The control circuit controls the electric power supplied to the halogen lamps 58 and 59 so that the detected temperatures inputted from the thermistors is maintained at the predetermined temperatures set for the fixing roller 51 and the pressing roller 52. In other words, the temperatures of the fixing roller 51 and the pressing roller 52 are controlled at predetermined levels, and the temperature of fixing nip N is maintained at the predetermined fixing temperature level.

The unfixed toner image carrying recording sheet (P) fed to the belt fixing device 106 side from the transfer belt mechanism 105 side is introduced into fixing nip N between the fixing belt 57 and the pressing roller 52, and is nipped and fed in fixing nip N. The surface, which has the unfixed toner image, of the recording sheet (P) contacts to the surface of the fixing belt 57. The recording sheet (P) is heated and pressed in the process of being nipped and fed in fixing nip N, and the color toner images are mixed and fixed. Simultaneously, the recording sheet (P) is closely contacted to the surface of the fixing belt 57.

Thereafter, the recording sheet (P) is fed with the rotation of the fixing belt 57 in the state of being closely contacted to the fixing belt 57 in a cooling region (cooling portion) R between fixing nip N and separation roller 53. In cooling region R, the fixing belt 57 and the recording sheet (P) are forcedly and efficiently cooled by the cooling fan 56 as the cooling means and the air flow through the inside of the air duct 56*a* surrounding it. The air flow in the direction perpendicular to the sheet of the drawing is produced by the cooling fan 56. In order to prevent the toner and the toner receiving layer from offsetting to the belt in this example, the recording sheet is cooled substantially to the glass transition temperature (50 degrees) of the toner (toner receiving layer) by the cooling fan.

In this manner, the recording sheet (P) in the close contact state is sufficiently cooled by the surface of the fixing belt 57 with the fixing belt 57 in the cooling region R. Subsequently, it reaches the position of the separation roller 53 and is separated by its rigid from the surface of the fixing belt 57 in the region where the curvature of the fixing belt 57 changes with the separation roller 53 (curvature separation).

Here, the recording material (P) may separate from the surface of the fixing belt 57 in the middle of the fixing belt cooling region (R) from the fixing roller 51 to the separation roller 53. If this occurs, the image may be confused, and/or it may become impossible to feed the recording material (P). The assisting roller 55 prevents this.

The cooling means 56 is not restricted to the fan but the cooling system of the contact type is usable. The circulation type cooling device of the Peltier element, the heat pipe, and the water is usable, too.

(4) Glossy Print;

In the case of outputting the glossy print, the sheet which has the toner receiving layer (B) of the resin material at the surface is used as the recording sheet (P). In this case, the toner of the unfixed toner image is heated and softened by the heating by the fixing belt 57 in the process in which the recording sheet (P) is nipped and fed in the fixing nip (N). The receiving layer (B) is heated and softened with this. Furthermore, the toner heated and softened by the application of the pressure of the fixing nip (N) is buried into the inside of the heated and softened receiving layer (B). Simultaneously, the recording sheet (P) is closely contacted to the surface of the fixing belt 57. Thereafter, the recording sheet (P) is fed in the cooling region (R) with the rotation of the fixing belt 57 in the state of closely contacting to the fixing belt 57, and therefore, they are forcedly cooled efficiently to a sufficient extend. The recording sheet (P) is separated from the surface of the fixing belt 57 by the curvature changing region by the separation roller 53.

Figure 7:
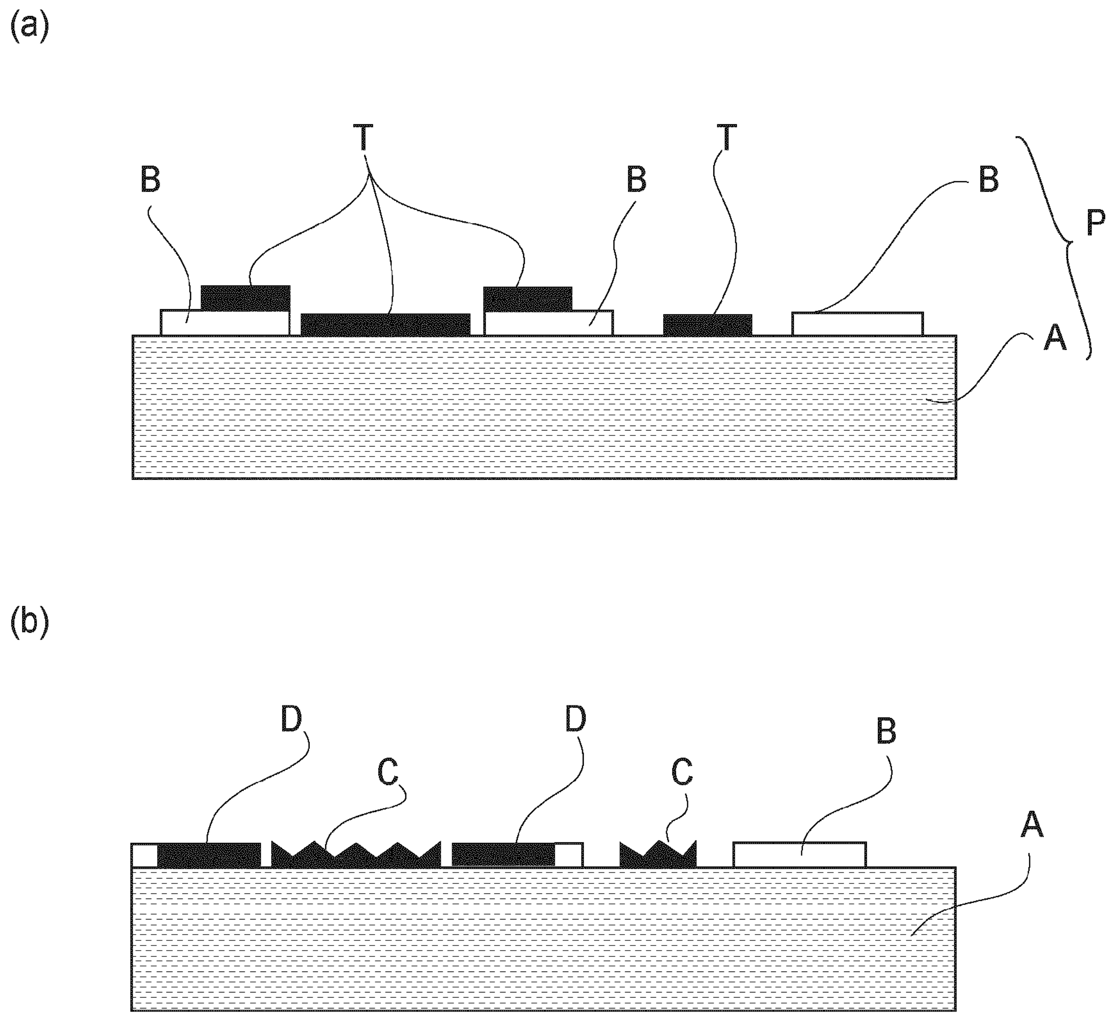
In FIG. 7, (*a*) is a schematic illustration (before the fixing) of the recording sheet of FIG. 1 carrying an unfixed toner image, and (b) is a schematic illustration of the recording sheet carrying the toner image fixed by a belt fixing device (after the fixing).

It is preferable to set the temperature of the cooling portion lower than the glass transition temperature (Tg) of the toner resin material. When the temperature of the cooling portion is not cooled to the temperature lower than the glass transition temperature (Tg), the surface of the toner resin material is not sufficiently solidified. For this reason, the toner resin material may deposit on the surface of the fixing belt 57 partially at the time of the recording sheet separation. If this occurs, the smoothness on the surface of the toner image may be detracted. In such a case, the smoothness of the toner surface after the recording sheet separation is insufficient, and the high glossiness is not sufficiently provided in the place where the high glossiness is desired. Furthermore, since the toner resin material does not sufficiently solidify, the depositing force between the fixing belt 57 and the toner resin material is large, and there is a possibility that the recording sheet may improperly be separated from the fixing belt surface.

referring to the schematic sectional view of FIG. 7 the description will be made about the image when the image formation is performed using the recording sheet (P) formed as shown in FIG. 1 with the type which the receiving layer (B) intersperses on the surface of the base paper (base material) (A). FIG. 7 is a schematic diagram. Actually, the toner image is formed on the recording sheet (P) correspondingly to the image (re-development) which should be formed, and therefore, except for the case where it is the special image, the deposited amounts of the toner differ depending on the position of the recording sheet (P).

The low glossiness base paper (A) of this recording sheet (P) is the coated paper having a basis weight of 170 $g/m^2$. The receiving layers (B) are formed on the one surface (coating layer side) of this base paper (A) using the silk-screen printing described above. They are the transparent resin layers with a thickness of 20 micrometers which comprises polyester (thermoplastic resin material) as a main component, and are interspersed in a regular arrangement in the same rectangular patterns. In addition, the toner used in this example is also the resin powder which comprises polyester as a main component.

In FIG. 7, (a) is a schematic illustration of the pre-fixing state in which the toner image (T) of the unfixed is carried on the above described recording sheet (P). In the same Figure, (b) is the schematic illustration of the post-fixing state in which this recording sheet (P) has been fixed by the belt fixing device 106 described above.

In (b), designated by (C) schematically illustrate the after-fixing configuration of the toner image portion corresponding to the place where the receiving layer (B) of the recording sheet (P) is not applied. Designated by (D) schematically illustrate the after-fixing configuration of the toner image portion corresponding to the place where the receiving layer (B) of the recording sheet (P) is applied.

Receiving layer (B) on which the toner image was fixed by the state where it embedded to the receiving layer (B), and fixed toner image portion (D) follow the specular-surface-like belt surface shape, are coagulated, and become the smooth surface, and therefore, it becomes an image portion having an excellent glossiness. The receiving layer (B) without the toner image follows the specular-surface-like belt surface shape, is coagulated, and it also becomes a smooth surface having an excellent glossiness.

On the other hand, the surface of the fixed toner image portion (C) in the place where the receiving layer (B) of the recording sheet (P) is not applied becomes a nonsmooth surface correspondingly to the surface property of the base paper and the deposited amount of the toner, and therefore, the high glossiness does not result. In addition, the surface property (low glossiness) of the base paper is reflected also in portion without the toner image on which the receiving layer (B) of recording sheet (P) is not applied, and therefore, the high glossiness does not result.

In other words, the portion having the receiving layer (B) of the recording sheet (P) becomes high-glossiness area irrespective of the presence or absence of the toner image, and the portion without the receiving layer (B) becomes low glossiness area irrespective of the presence or absence of the toner image. By this, the non-uniform-glossiness image can be provided, and therefore, the image having an excellent the art property can be provided with the interspersing high glossy images.

The image formation was carried out with the image forming apparatus of FIG. 4 using the recording sheet (P) of FIG. 1. The used belt fixing device 106 has the structures illustrated in FIG. 6. The fixing temperature is the 150 degrees, the fixing speed is 50 mm/sec, and the pressure is 50 kg. The output of the cooling means 56 was adjusted so that the surface temperature of the fixing belt 57 on the separation roller 53 is 50 degrees which is lower than the glass transition point (Tg) of the toner resin material. Such the settings are carried out by CPU 200 (FIG. 6) as the control means, and the operation of the belt fixing device 106 is controlled in accordance with them.

The conditions (fixing conditions) for the satisfactory smoothing process (fixing process) of the toner receiving layer which has 40 to 80 degrees of the glass transition temperature include at least one of the fixing temperatures, fixing speeds, and pressures as will be described hereinafter.

The fixing temperature (target temperature of the fixing roller 51) is not less than 100 degrees which is near the softening point temperature of the toner, and it is preferable that it is below the 170 degrees which is near the paper blister generation temperature. Here, the paper blister is the phenomenon in which the water vapor produced by excessive heating of the water content in the base paper breaks through the toner receiving layer, and is discharged outside.

It is preferable that the fixing speed (feeding speed of the recording sheet (P)) is not more than 75 mm/sec and not less than 25 mm/sec. It is preferable that the pressure (pressure between the belt 57 and the pressing roller 52) is not more than 75 kg (735 (N)) and not less than 25 kg (245 (N)).

In the fixed recording sheet, the solid image glossiness of the toner surface of the fixed toner image (D) of the portion on which the receiving layer (B) is applied, and the solid image glossiness of the toner surface of the fixed toner image (C) of the portion on which the receiving layer (B) is not applied, are measured. In this glossiness measurement, a glossiness meter (PG)-1 (M) available from Nippon Denshoku, Inc. is used, and the glossiness (glossiness value in 60 degrees of measuring angles) is measured with 60 degrees of the incident angle and 60 degrees of the light receiving angle. The image to be measured is formed all over the recording sheet (P) as the uniform solid image with two different color toners. The toner amounts of the image were 0.6 mg/cm$^2$ (total 1.2 mg/cm$^2$) for each color.

The glossiness value G1 of the fixed toner image (D) of the portion on which the receiving layer (B) was applied is 90, and the high glossiness is provided. On the other hand, the glossiness value G2 of the fixed toner image of the portion on which the receiving layer (B) was not applied is 50, and the low glossiness is provided.

Figure 8:
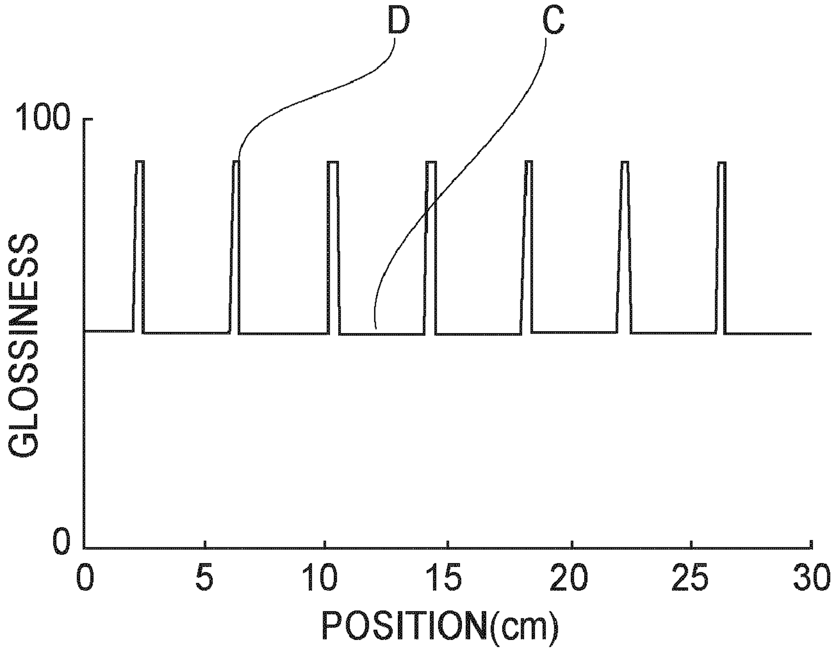
FIG. 8 shows the results of glossiness in 60 degrees of measuring angles in Embodiment 1.

The glossiness of the recording sheet at this time is illustrated in FIG. 8. FIG. 8 shows the glossiness measured with 60 degrees of measuring angles along X line on the recording sheet (P) of FIG. 1. From this result, the glossiness value G1 of the position where the receiving layer (B) is applied is as high as 90. On the other hand, the glossiness value G2 of the position where the receiving layer (B) is not applied is as low as 50. The high glossy image was provided only to the position where the receiving layer (B) had been applied. By processing the recording sheet (P) which has the interspersing toner receiving layers with the smoothing apparatus (fixing device), the high glossiness portion and the low glossiness portion are intermingled with the difference of 20 or more glossiness independently from the formed toner image.

In this manner with the structure of this example, the image which has the high glossiness portion and the low glossiness portion with the glossiness difference not less than at least 20 can be formed on one recording sheet (P) irrespective of the toner image formed.

The fixed toner images (D) which have the high-glossiness surface in the fixed toner image portion (C) which has the low glossiness surface are provided with uniform or non-uniform distribution with given patterns. By this, when the angle of the recording sheet (P) is changed, the high-glossiness fixed toner image portion (D) will be recognized as emerging partially. In this manner, a new print was provided.

When the image portions (D) of the high glossiness value G1 intersperse in the image portion (C) of the low glossiness value G2, the difference thereof will be conspicuous in the person's visual sense. It is the special image whose design property and art property are high unlike the conventional structure in which the whole surface of the recording sheet (P) has the high glossiness.

It is preferable that the difference (difference in the glossiness values G1 and G2) of the contrast between the high-glossiness image portion (D) and the high-glossiness low glossiness image portion (C) is 20 or more from the viewpoint of the person's visual property. Further preferably, in order to increase the visibility of the high glossiness portion, the contrast of the glossiness is 40 or more. It is desirable that it is in other words, $G1-G2\geqq 20$ (40) in the above described measuring condition.

Figure 10:
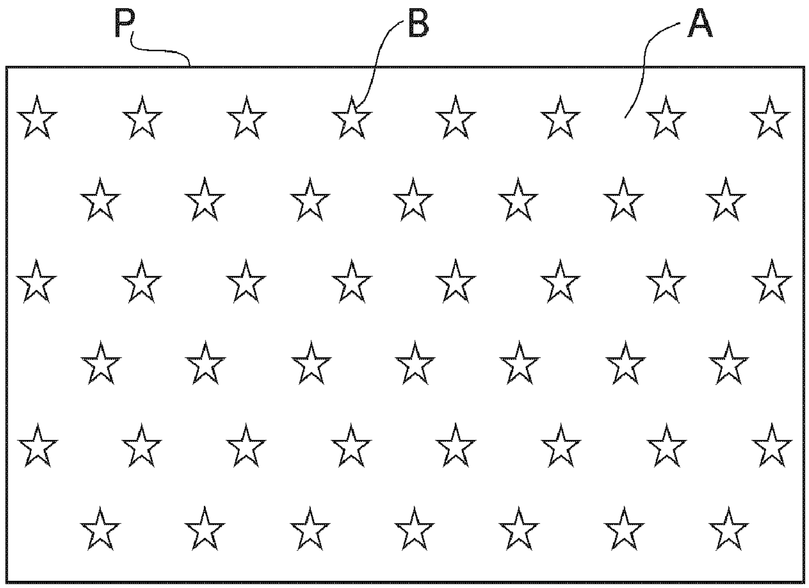
FIG. 10 is a schematic plan view of a recording sheet according to further example.

The pattern type of the receiving layer (B) which the surface of the recording sheet (P) is provided with is arbitrary. It is possible to employ another desired pattern as shown in FIG. 9 or FIG. 10 by changing the pattern of the printing film of silk-screen printing into the desired pattern, for example. The receiving layer (B) may be formed with regular arrangement of the same patterns, as shown in FIG. 1, FIG. 9, and FIG. 10. Alternatively, they may be formed with the non-uniform arrangement. Further alternatively, they may be formed partially. Further alternatively, the receiving layers (B) comprising a mixture of different patterns.

Since it is possible to form the image which has the different glossinesses in the recording sheet by the present invention, a unique property and merchantability can be provided.

The material of the recording sheet P in this embodiment, the thickness, and the fixing condition are not limited to the exemplified value, but the values of the glossiness provided differ correspondingly to these conditions.

Embodiment 2

Figure 11:
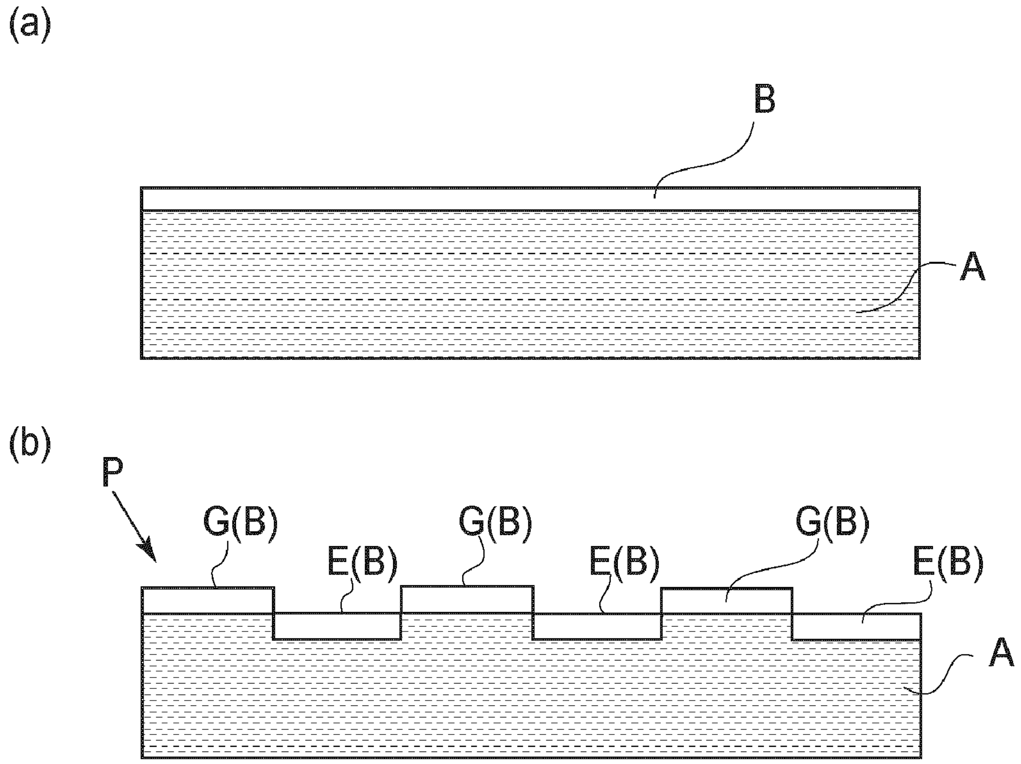
FIG. 11 is an illustration of a recording sheet according to Embodiment 2, wherein (a) is a schematic illustration of the recording sheet before an embossing process, and (b) is a schematic sectional view of the recording sheet after the embossing process.

In the manufacturing method of the recording sheet (P) of this embodiment, the toner receiving layer (B) comprising the resin material is completely applied on the surface of the base paper (base material) (A) as shown in the schematic illustration of (a) of FIG. 11. Thereafter, the embossing process is carries-out as shown in the schematic illustration of (b) of FIG. 11.

In this manner, the recesses (E) and the projections (G) which were provided by the embossing process intersperse on the receiving layer (B) of the recording sheet (P).

The image formation is carried out similarly to Embodiment 1 using the recording sheet (P) provided by this embossing process.

Figure 12:
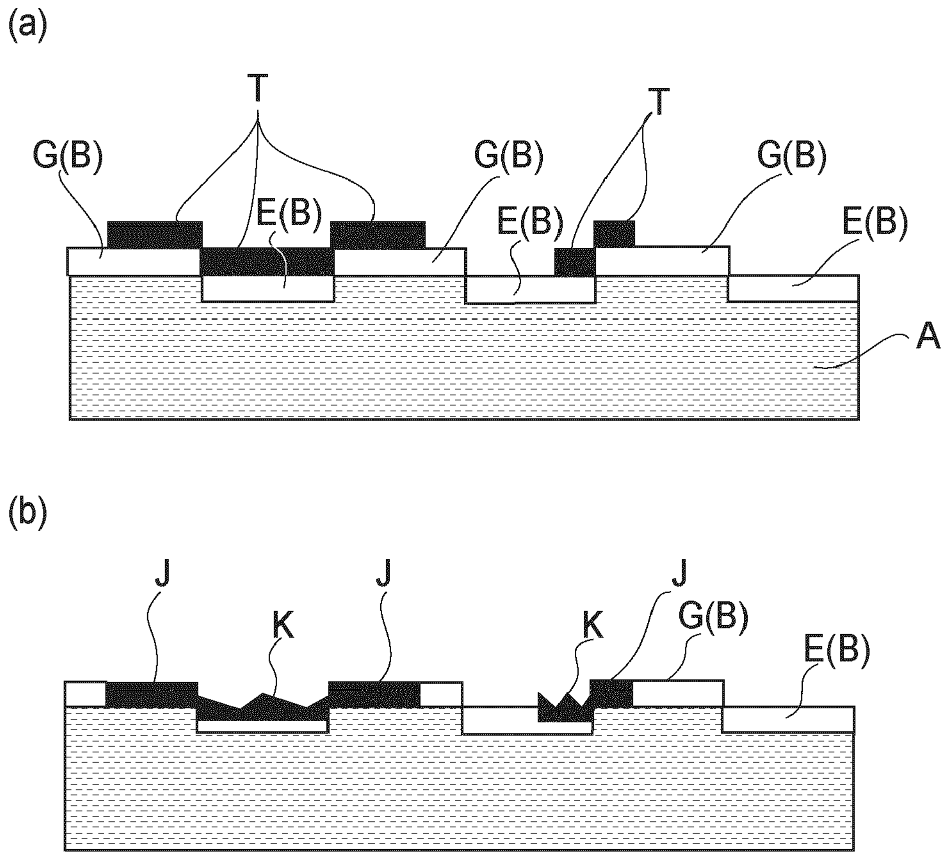
In FIG. 12, (*a*) is the schematic illustration (before the fixing) of the recording material of FIG. 11 carrying an unfixed toner image, and (b) is the schematic illustration of the recording sheet carrying the toner image by which the fixing was carried out with the belt fixing device (after the fixing).

(a) of FIG. 12 is a schematic illustration of pre-fixing state in which the above described recording sheet (P) carries the unfixed toner image (T). The unfixed toner image (T) is formed on the receiving layers (B) both in the areas of the projections (G) and the recesses (E).

(b) is a schematic illustration of the post-fixing state after fixing this recording sheet (P) using the above described belt fixing device 106. Reference character (J) schematically shows the after-fixing configuration of the toner image portion corresponding to the projection (G) of the receiving layer (B). Reference character (K) schematically shows the after-fixing configuration of the toner image portion corresponding to the embossed position (E) of the concave of the receiving layer (B).

Similarly to embodiment 1, the toner image portion formed on the projection (G) is closely contacted to the fixing belt 57, and is subjected to the fixing and the cooling operation, and therefore, the fusing of it is sufficiently carried out and it is embedded in the receiving layer (B). In this portion, the receiving layer (B) and the fixed toner image portion (J) follow the specular-surface-like belt surface shape, are coagulated, and become a smooth surface, and therefore, it is the image portion having an excellent the glossiness. In addition, the projection (G) without the toner image follows the specular-surface-like belt surface shape, is coagulated, and the smooth surface having an excellent the glossiness is become.

On the contrary, the close contact to the fixing belt 57 is incomplete in the toner image portion formed on the recess (E). Then, sufficient heat supply is not effected for the toner of the recess (E) from the fixing belt 57, and therefore, it does not sufficiently fuse. In addition, the surface property of the fixing belt 57 is not sufficiently transferred onto the toner image surface. As a result, the toner image is not completely embedded in the receiving layer (B) in the recess (E), and the fixed toner image surface thereof is roughened, and a low glossiness state results. The portion without the toner image is not provided in sufficient glossiness in the recess (E), but a low glossiness portion results.

By doing so, corresponding to the configurations of the unsmoothness of the receiving layer (B), the high glossiness image portions and the low glossiness image portions intersperse on the fixed toner image on the recording sheet (P).

Therefore, it is similarly to the case of Embodiment 1. the high glossy image can be interspersed partially and the image having an excellent the design property and the art property is provided.

About the depth of the unsmoothness provided by the embossing process, when the depth of the recess relative to the projection is larger than about 50 micrometers, there is the tendency for the high-glossiness image portion and the image portion of the low glossiness to intersperse on the fixed toner image (although it is dependent on the basis weight of the recording sheet). When it exceeds 100 micrometers, this tendency becomes remarkable. For this reason, it is preferable that the depth (average value) of the recess relative to the projection is 50 micrometers or more 500 micrometers or less.

In addition, when the width of the recess is small, the configuration following action of the fixing belt 57 is difficult. More specifically, the whole recess is low in glossiness when it is smaller than about 5 mm. When the width of the recess is large, the fixing belt 57 may contact to the central portion of the inside bottom of the recess, but it cannot contact to the marginal portion of the bottom of the recess. Therefore, when width is larger than about 5 mm, the central portion of the bottom of the recess has the slightly high glossiness, but the marginal portion of the bottom of the recess is still low in glossiness, and therefore, the glossiness difference relative to the projection results. For this reason, even when the width of the recess is large, the glossiness difference relative to the projection is produced. For this reason, it is preferable that the width of the recess is 1 mm or more and 5 mm or less.

From the above analyses, as for the factors of the production of the glossiness difference due to the unsmoothness, the influence of the depth of the recess is significant. In addition, when the hardness of the surface layer material of the fixing belt 57 is hard, the followability to the unsmoothness portion is the poor, and therefore, there is the tendency for the glossiness difference to become great.

Actually, the glossinesses of the toner surface, after the fixing, formed on projection (G) and recess which has the depth of 100 micrometers relative to the projection (E) were measured similarly to Embodiment 1.

As a result, the glossiness value of 90 resulted in the after-fixing toner surface similarly to Embodiment 1 in the projection (G), and the glossiness value of 60-70 resulted in the after-fixing toner surface in the recess (E).

Figure 13:
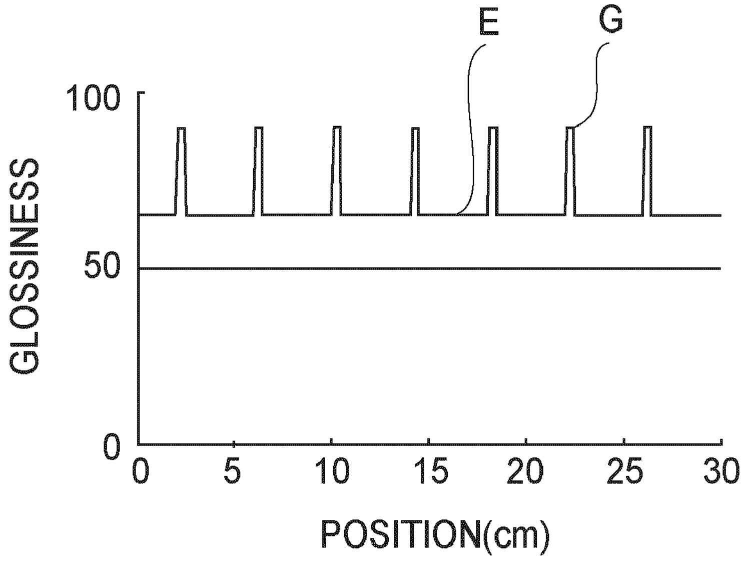
FIG. 13 shows results of glossiness in 60 degrees of measuring angles in Embodiment 2.

FIG. 13 illustrates a result of the glossiness values of the unsmoothness portion. The projection has a high glossiness correspondingly to the configuration of the emboss, and the recess has a low glossiness.

However, in the this embodiment, the receiving layer (B) is applied on the whole surface on the base paper (base material) (A), and therefore, the toner is slightly embedded into the receiving layer (B) also in the recess (E). Therefore, the glossiness value of the low glossiness portion is higher than in Embodiment 1, and the contrast between the high glossiness portion and the low glossiness portion is smaller than in Embodiment 1.

However, also in this embodiment, similarly to embodiment 1, when the angle of the recording sheet (P) is changed, the high glossiness image portion (J) can emerge partially and, unlike the conventional image, the new image having a high design property and art property can be provided.

It is desirable for the relation between the glossiness value (G3) with 60 degrees of measuring angles after the separation from the belt of the projection of the recording sheet (P) and the glossiness value (G4) with 60 degrees of measuring angles after the separation from the belt of the recess to satisfy (G3)−(G4)>=20. By this, the large contrast difference between the high glossiness and the low glossiness is assured, and the image having an excellent art property can be provided.

In addition, in this embodiment, the surface of the recording sheet is also rugged form physically correspondingly to the place of the glossiness, and therefore, in addition to the visual sense, the feature which is new also in the tactile sense is added.

According to the present invention, it is possible to form the given image different in the glossiness and the configuration in the recording sheet, and the new different property and the different new merchantability can be provided.

After interspersing the toner receiving layer on the surface of the recording material base material like Embodiment 1, the embossing process may be performed to the surface.

The fixing device which fixes the unfixed toner image in the above embodiments 1 and 2 has the function as a smoothing apparatus, but the present invention is not limited to such a structure. For example, a temporary fixing-fixing machine which temporally fixes the unfixed toner image on the recording sheet may be provided in the image forming apparatus. In this case, the smoothing apparatus mentioned above may be separately prepared as an optional unit which can be freely mounted and demounted on the image forming apparatus. In this case, the optional unit is a constituent element of the image forming system. The temporary fixing-fixing machine mentioned above provides the function as the fixing device for the usual sheet.

While the invention has been described with reference to the structures disclosed herein, it is not confined to the details set forth, and this application is intended to cover such modifications or changes as may come within the purposes of the improvements or the scope of the following claims.

This application claims priority from Japanese Patent Application No. 305207/2006 filed Nov. 10, 2006, which is hereby incorporated by reference.

What is claimed is:

1. An image receiving sheet for electrophotography comprising:

a base material;

toner receiving resin material layers provided on said base material and having a glass transition temperature of not less than 40° C. and not more than 80° C., wherein said toner receiving layers are interspersed on said base material.

2. A sheet according to claim 1, wherein said toner receiving resin material layers are regularly arranged on said base material.

3. A sheet according to claim 1, wherein said toner receiving resin material layers are substantially transparent.

4. An image receiving sheet for electrophotography comprising:

a base material;

toner receiving resin material layers provided on said base material and having a glass transition temperature of not less than 40° C. and not more than 80° C., wherein said toner receiving resin material layers are embossed, and wherein recesses provided by the embossing on said toner receiving resin material layers is not less than 50 μm and not more than 500 μm.

5. An image receiving sheet for electrophotography comprising:

a base material;

toner receiving resin material layers provided on said base material and having a glass transition temperature of not less than 40° C. and not more than 80° C., wherein said toner receiving resin material layers are embossed, and wherein recesses provided by the embossing on said toner receiving resin material layers has widths of not less than 1 mm and not more than 5 mm.

6. A sheet according to claim 4, wherein said toner receiving resin material layers are substantially transparent.

7. A sheet according to claim 5, wherein said toner receiving resin material layers are substantially transparent.

* * * * *